(12) United States Patent
Cash et al.

(10) Patent No.: US 12,189,406 B2
(45) Date of Patent: Jan. 7, 2025

(54) GAS SHUT-OFF IN A PARTICULATE REMOVAL DEVICE AND METHOD

(71) Applicant: Durr Systems, Inc., Southfield, MI (US)

(72) Inventors: James Cash, Hackettstown, NJ (US); Jeffrey Rudolph, Suamico, WI (US)

(73) Assignee: Durr Systems, Inc., Southfield, MI (US)

( * ) Notice: Subject to any disclaimer, the term of this patent is extended or adjusted under 35 U.S.C. 154(b) by 513 days.

(21) Appl. No.: 17/422,669

(22) PCT Filed: Feb. 5, 2021

(86) PCT No.: PCT/US2021/016727
§ 371 (c)(1),
(2) Date: Jul. 13, 2021

(87) PCT Pub. No.: WO2021/081564
PCT Pub. Date: Apr. 29, 2021

(65) Prior Publication Data
US 2022/0118463 A1 Apr. 21, 2022

Related U.S. Application Data

(60) Provisional application No. 63/033,372, filed on Jun. 2, 2020.

(51) Int. Cl.
*B03C 3/16* (2006.01)
*B01D 47/06* (2006.01)
(Continued)

(52) U.S. Cl.
CPC ............. *G05F 1/147* (2013.01); *B01D 47/06* (2013.01); *B03C 3/16* (2013.01); *B03C 3/41* (2013.01);
(Continued)

(58) Field of Classification Search
CPC .... B03C 3/16; B03C 3/36; B03C 3/41; B03C 3/49; B03C 3/53; B03C 3/70; B03C 3/74;
(Continued)

(56) References Cited

U.S. PATENT DOCUMENTS 3,627,898 A * 12/1971 Ibach .................. B03C 3/70
                                                    96/26
3,892,546 A    7/1975 Grisell
(Continued)

FOREIGN PATENT DOCUMENTS

CN      201609674 U    10/2010
CN      104549742 A     4/2015
(Continued)

OTHER PUBLICATIONS

International Search Report and Written Opinion mailed Apr. 15, 2021 in corresponding PCT application No. PCT/US2021/016727.
(Continued)

*Primary Examiner* — Christopher P Jones
*Assistant Examiner* — Sonji Turner
(74) *Attorney, Agent, or Firm* — Nields, Lemack & Frame, LLC

(57) ABSTRACT

Method and apparatus for cleaning pollution control equipment, such as particulate removal devices, including wet electrostatic precipitators (WESP). The apparatus may include a housing having a chamber, at least one process gas inlet in fluid communication with the chamber, a process gas outlet spaced from the at least one process gas inlet and in fluid communication with the chamber, one or more ionizing electrodes in the housing and one or more collection electrodes or plates in the housing. Sealing liquid is provided and introduced into the chamber in an amount sufficient to submerge the at least one process gas inlet and stop the flow of contaminated gas into the chamber.

9 Claims, 8 Drawing Sheets

(51) Int. Cl.
  *B03C 3/41* (2006.01)
  *B03C 3/49* (2006.01)
  *B03C 3/53* (2006.01)
  *B03C 3/78* (2006.01)
  *G05F 1/14* (2006.01)
  *G05F 1/147* (2006.01)
  *H02J 3/12* (2006.01)
  *B01D 47/02* (2006.01)

(52) U.S. Cl.
  CPC ............... *B03C 3/49* (2013.01); *B03C 3/53* (2013.01); *B03C 3/78* (2013.01); *G05F 1/14* (2013.01); *H02J 3/12* (2013.01); *B01D 47/021* (2013.01); *Y02P 80/15* (2015.11)

(58) Field of Classification Search
  CPC .... B03C 3/78; B03C 3/88; B03C 3/06; B01D 47/06
  See application file for complete search history.

(56) References Cited

U.S. PATENT DOCUMENTS

| | | | |
|---|---|---|---|
| 4,968,330 | A | 11/1990 | Wolf et al. |
| 6,106,592 | A * | 8/2000 | Paranjpe ............ B03C 3/16 95/71 |
| 8,414,680 | B2 | 4/2013 | Karlsson |
| 2005/0025208 | A1 | 2/2005 | Bliven et al. |
| 2006/0226373 | A1 | 10/2006 | Ray et al. |
| 2006/0261265 | A1 | 11/2006 | Ray et al. |
| 2023/0158513 | A1 * | 5/2023 | Rudolph ............ B03C 3/82 134/22.12 |

FOREIGN PATENT DOCUMENTS

| | | |
|---|---|---|
| CN | 204900947 U | 12/2015 |
| CN | 109127138 A | 1/2019 |
| CN | 208320764 U | 1/2019 |
| CN | 208787089 U | 4/2019 |
| EP | 2614894 A1 | 7/2013 |
| GB | 1289733 A | 9/1972 |
| JP | 2010-104886 A | 5/2010 |

OTHER PUBLICATIONS

Electrostatic precipitator, Wikipedia, Feb. 23, 2021 (Feb. 23, 2021) [retrieved from internet on Sep. 24, 2021 (Sep. 24, 2021) <https://en.wikipedia.org/wiki/Electrostatic_precipitator>].

Chinese communication, with English translation, dated Mar. 5, 2024 in corresponding Chinese patent application No. 202180002171.6.

European communication dated Apr. 12, 2024 in corresponding European patent application No. 21720669.7.

Chinese communication, with English translation, dated Aug. 21, 2024 in corresponding Chinese patent application No. 202180002171.6.

Shanghai Environmental Protection Industry Co., Ltd., "Industrial air pollution prevention technology and application", Shanghai Science and Technology Publishing House, Nov. 30, 2016.

* cited by examiner

SIMPLIFIED WESP SCHEMATIC USING RECYCLE WATER TO FLUSH

GAS SHUT-OFF IN A PARTICULATE REMOVAL DEVICE AND METHOD

This application claims priority of U.S. Provisional Application Ser. No. 63/033,372 filed Jun. 2, 2020, the disclosure of which is incorporated herein by reference in its entirety.

BACKGROUND

Pollution control equipment, such as wet electrostatic precipitators (WESP) are used to remove dust, acid mist and other particulates from water-saturated air and other gases by electrostatic means. For example, particulates and/or mist laden water-saturated air flows in a region of the precipitator between discharge and collecting electrodes, where the particulates and/or mist is electrically charged by corona emitted from the high voltage discharge electrodes. As the water-saturated gas flows further within the precipitator, the charged particulate matter and/or mist is electrostatically attracted to grounded collecting plates or electrodes where it is collected. The accumulated materials are continuously washed off by both an irrigating film of water and periodic flushing to a discharge drain or the like.

Such systems are typically used to remove pollutants from the gas streams exhausting from various industrial sources, such as incinerators, coke ovens, glass furnaces, non-ferrous metallurgical plants, coal-fired generation plants, forest product facilities, food drying plants, wood product manufacturing and petrochemical plants.

In wood product manufacturing, for example, maintenance issues are problematic, particularly due to material build-up in equipment such as wet electrostatic precipitators (WESP). Sticky particulates, condensation products, etc. tend to adhere to and accumulate on equipment internals, resulting in deleterious downtime and unnecessary expense in an effort to remove them. This has been seen in not only in the manufacture of wood products such as panelboard, for example, but also in the biofuel and other markets. Manual intervention is often necessary to adequately clean the equipment internals from the build-up of contaminants, which is highly undesirable.

In some conventional wet electrostatic precipitators, scrubbing water flow is utilized to wash the surface of internals, such as the collection electrode surfaces. For example, scrubbing water can be introduced onto a distribution plate, and then flowed into the inner surface of the collection plates to remove the collected particles. However, this tends to decrease the electric field strength due to high conductivity of water. The high conductivity causes significant increase in current flow. The electric field strength (a.k.a. voltage) is then reduced to keep this current flow below the maximum current rating of the power supply, and often is ineffective in removing all of the collected particles. As a result, periodic shutting down of the WESP is carried out, so that the internals of the apparatus can be thoroughly flushed and/or manually cleaned.

It therefore would be desirable to provide an apparatus, system and method for cleaning the internals; i.e., ridding them of sticky or adherent particles that have built up over time, in an efficient and cost-effective manner with minimal or no manual intervention.

SUMMARY

Problems of the prior art have been addressed by the embodiments disclosed herein, which provide a method and apparatus for cleaning pollution control equipment, such as particulate removal devices, including wet electrostatic precipitators. In certain embodiments, the WESP includes a housing having a chamber, at least one gas inlet in fluid communication with the chamber, a gas outlet spaced from the at least one gas inlet and in fluid communication with the chamber, one or more ionizing electrodes in the housing and one or more collection electrodes or plates in the housing. In certain embodiments, the housing is in fluid communication with a sealing liquid source, such as a source of water. In one embodiment, the collection electrodes include a bundle of tubes or cells, which may be cylindrical or hexagonal in cross-section, or plate type. In some embodiments, the bundle of tubes forms a honeycomb pattern of hexagonal collecting zones or cells.

In certain embodiments, the region of the chamber upstream of the collection electrodes is provided with a volume reducer. In some embodiments, the volume reducer comprises a half-pipe or barrel-shaped member. In some embodiments, one or more anti-wave baffles are provided to minimize or eliminate wave formation during filling with liquid this region of the chamber.

In certain embodiments, a method of removing particulate matter from a contaminated gas supply is provided, the method comprising providing a particulate removal device comprising one or more ionizing electrodes, one or more particulate collection electrodes or plates, a source of high voltage for charging the one or more ionizing electrodes, and a chamber having at least one process gas inlet for the contaminated process gas or air, the chamber being in fluid communication with the one or more ionizing electrodes and the one or more particulate collection electrodes; providing a source of contaminated process gas; providing a source of sealing liquid; causing the contaminated process gas to flow into the chamber via the at least one process gas inlet; and supplying sealing liquid to the chamber in an amount sufficient to submerge the at least one process gas inlet and stop the flow of contaminated gas into the chamber. As a result, the contaminated gas is routed to other regions or modules of the particulate removal device not undergoing a flush where particulate matter can continue to be removed. In certain embodiments, the components are then cleaned, and the sealing liquid is drained from the chamber, causing the flow of process gas to resume into the chamber as the process gas inlet is no longer submerged.

In certain embodiments, the particulate removal device includes a plurality of modular units. In certain embodiments, the units are modular in the sense that they are electrically isolated from one another. At any given time, one or more of the plurality of modular units can be taken offline, where process gas flow through the unit taken offline is effectively stopped by submerging the inlet of process gas into that unit with a sealing liquid such as water. As a result, the process gas flow is confined to the one or more remaining modular units that are not offline, during which time the offline unit is cleaned by a washing liquid. In some embodiments, the sealing liquid level in the chamber can be controlled to create scrubber action and help clean internals of the particulate removal device. In some embodiments, the sealing liquid level is reduced by including in the chamber a volume reducing member such as a half-pipe. The liquid reducer occupies volume in the chamber that otherwise would be vacant, and prevents liquid from entering other regions of the chamber, thereby reducing the volume of liquid necessary to flood the chamber to an extent effective for submerging the process gas inlet and stopping gas flow therefrom.

In certain embodiments, the particulate removal device is an up-flow WESP, where gas is introduced upstream or below the one or more ionizing electrodes and flows upwardly in the device.

Accordingly, in one aspect, a method of ceasing gas flow into a particulate removal device is disclosed, the method comprising: providing a particulate removal device comprising at least one ionizing electrode, at least one particulate collection electrode, a source of high voltage for charging said at least one ionizing electrode, a source of sealing liquid, and a chamber having at least one inlet for introducing a process gas into the device, the chamber being in fluid communication with the at least one ionizing electrode and the at least one particulate collection electrode; introducing a process gas into the chamber via the at least one inlet; introducing the sealing liquid into the chamber in an amount sufficient to submerge the at least one inlet and stop the flow of process gas into the chamber.

In another aspect, a particulate removal device is disclosed, the device comprising a housing comprising at least one ionizing electrode, at least one particulate collection electrode, a chamber having at least one gas inlet for introducing a process gas into the device, the chamber being in fluid communication with the at least one ionizing electrode and the at least one particulate collection electrode; at least one liquid inlet for introducing liquid into the chamber; a volume reducer in the chamber, and one or more wave reducing baffles in the chamber.

These and other non-limiting aspects and/or objects of the disclosure are more particularly described below. For a better understanding of the embodiments disclosed herein, reference is made to the accompanying drawings and description forming a part of this disclosure.

BRIEF DESCRIPTION OF THE DRAWINGS

The embodiments disclosed herein may take form in various components and arrangements of components, and in various process operations and arrangements of process operations. The drawings are only for purposes of illustrating preferred embodiments and are not to be construed as limiting. This disclosure includes the following drawings.

DETAILED DESCRIPTION

Figure 1:
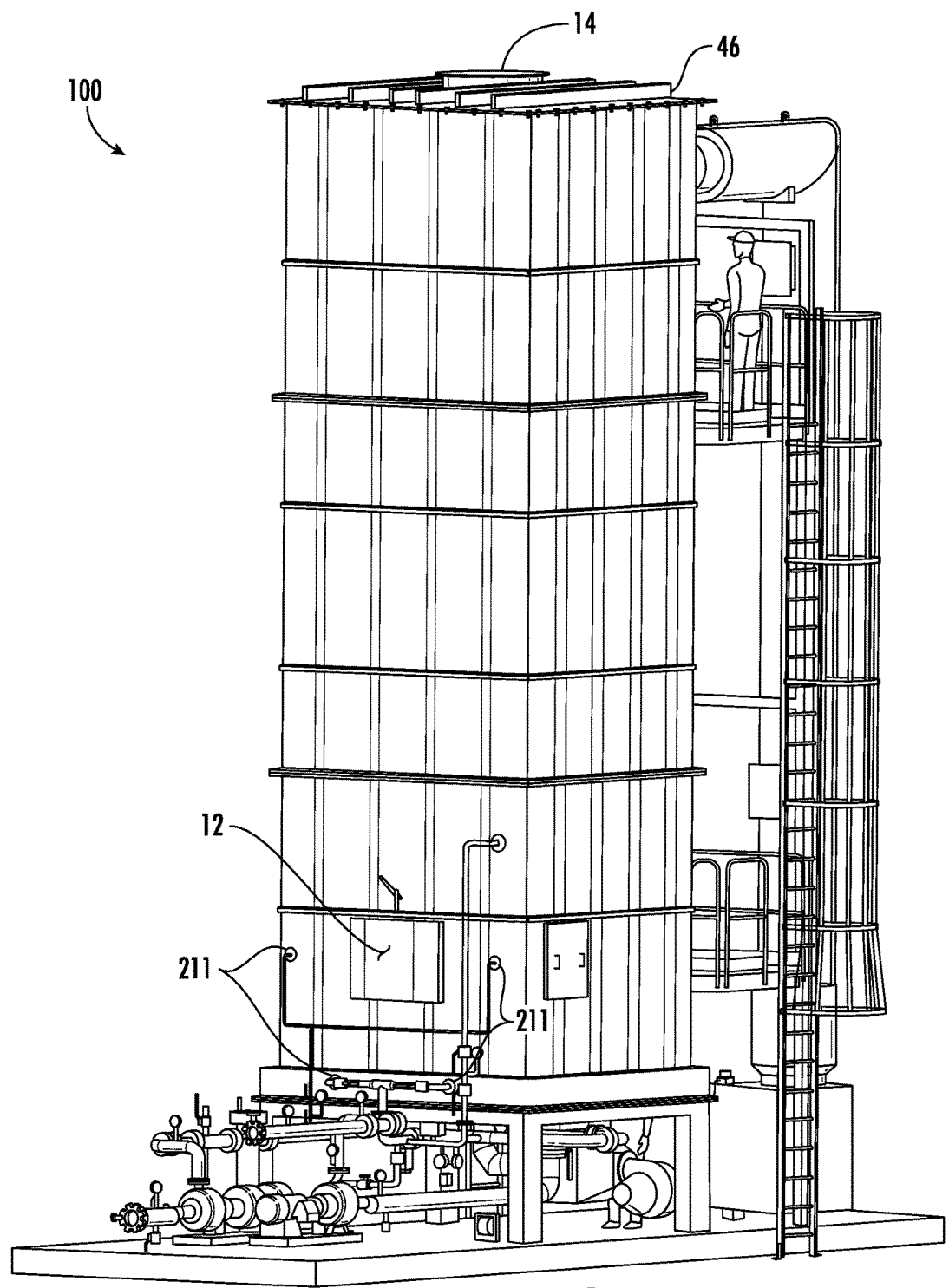
FIG. 1 is a perspective view of an exemplary WESP in accordance with certain embodiments.

A more complete understanding of the components, processes and apparatuses disclosed herein can be obtained by reference to the accompanying drawing. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawing, and are not intended to define or limit the scope of the disclosure. In the drawing and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

All ranges disclosed herein are inclusive of the recited endpoint and independently combinable (for example, the range of "from 2 inches to 10 inches" is inclusive of the endpoints, 2 inches and 10 inches, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component, and should not be construed as requiring a particular orientation or location of the structure. As a further example, the terms "interior", "exterior", "inward", and "outward" are relative to a center, and should not be construed as requiring a particular orientation or location of the structure.

The terms "top" and "bottom" are relative to an absolute reference, i.e. the surface of the earth. Put another way, a top location is always located at a higher elevation than a bottom location, toward the surface of the earth.

The terms "horizontal" and "vertical" are used to indicate direction relative to an absolute reference, i.e. ground level. However, these terms should not be construed to require structures to be absolutely parallel or absolutely perpendicular to each other.

Embodiments disclosed herein include apparatus for removing particulate matter from a gas stream containing particulate matter, and may include a mist-generating member that mixes a gas stream entering the apparatus with liquid droplets, one or more ionizing electrodes that electrically charge the particulate matter and the liquid droplets; one or more collecting surfaces such as one or more collecting electrodes or plates that attract and remove electrically-charged particulate matter and intermixed liquid droplets from the gas stream; and a source of sealing liquid. The purpose of the sealing liquid is to create a barrier to prevent gas flow. Any liquid could be used provided it has a high enough density that the level of the liquid is sufficient to create a pressure differential greater than the gas flow can overcome. In certain embodiments, the one or more collecting surfaces includes one or more elongated tubes or cells. In some embodiments, the tubes or cells are hexagonal in cross-section.

Figure 1A:
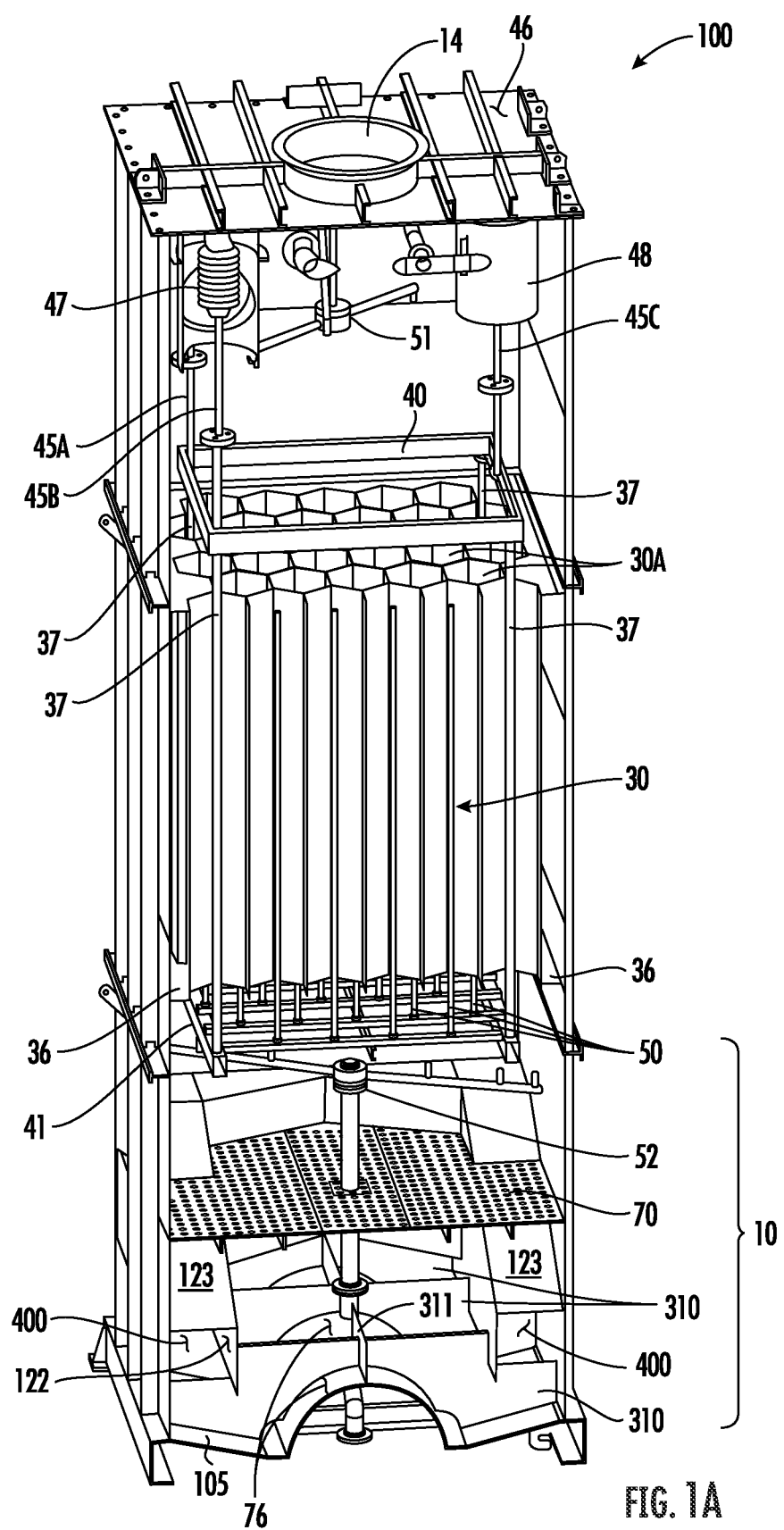
FIG. 1A is a perspective view of an exemplary WESP, showing certain internal components.

Referring now to FIGS. 1 and 1A, an exemplary WESP unit 100 is shown and is an upflow design having a vertical orientation. An upflow design has certain advantages, which include eliminating the need for demisting at the outlet, allowing for liquid and solid contaminants to collect by gravity before they reach (and potentially contaminate) the collection electrodes, and enabling a simplified layout if exhausting directly to a stack. A further advantage of an upflow device is that any water droplets present are carried upward by the airflow, and eventually caused to collect on the collecting surfaces. As a result, the upflow device functions as a demister, preventing any droplets from becoming entrained in the gas flow that exits the device. Similarly, during a flush cycle of a particular compartment, where the gas flow ceases, water droplets cannot become entrained because no gas flow is leaving the compartment being flushed. However, other designs may be used, including downflow designs.

In some embodiments, the unit 100 has one or more lower process gas inlets 12 and one or more upper outlets or exhausts 14 spaced from the one or more lower process gas inlets 12. The one or more lower process gas inlets 12 may be in fluid communication with suitable ducting or the like to direct process gas in a generally upward flow to be treated by the unit 100 towards collection surfaces that may include an array 30 of a plurality of cells 30A (FIG. 1A). In certain embodiments, the location of the one or more process gas inlets 12 in the chamber 10 is below or upstream, in the direction of process gas flow, of the array 30 of cells, and is located so that the chamber can be flooded with liquid in amount sufficient to submerge the one or more inlets 12 and stop gas flowing therefrom.

Preferably the cells 30A in the WESP are hexagonal in cross-section. The array 30 of cells 30A is provided in the unit 100 in a region between the one or more inlets 12 and the outlet 14. The array 30 of cells 30A can be supported in the unit 100 by any suitable means, such as from the side and/or the bottom by supporting the outer perimeter of the array 30 with the use of angle irons 36 or similar supports. In certain embodiments, the array 30 may be formed by coupling individual plates or walls in the desired shape such as by welding. As can be seen in the embodiment of FIG. 1A, adjacent cells 30A share common walls and form an array. The number of cells 30A in an array 30 is not particularly limited; any array size is suitable, although smaller arrays are easier to ship in an assembled condition. In the embodiment shown, the array 30 is a 5/6×7 array (the term "5/6" is used to indicate that the rows of cells alternate between 5 and 6 cells or tubes per row).

In certain embodiments, an upper high voltage frame 40 and a lower high voltage frame 41 are suspended from the top wall 46 of the unit 100 with suitable supports including one or more support rods (three shown as 45A, 45B and 45C). The lower high voltage frame 41 is supported from the upper high voltage frame 40 by one or more support electrodes 37, preferably four, and supports a plurality of electrodes or masts 50. Each of the plurality of masts 50 may be generally elongated and rod-shaped and extends upwardly into a respective cell 30A, and is preferably positioned in the center of each cell 30A and is coaxial therewith. In certain embodiments, the volume of each cell 30A defined by its outer wall or walls is empty except for a mast 50. In some embodiments each of the masts 50 is attached to the lower high voltage frame grid with a single bolt or other fastener, and each mast 50 can be pre-aligned prior to assembly into the unit 100. In some embodiments, suitable position adjusters can be provided on the masts 50 to properly position them in the unit 100. By supporting the masts 50 from the bottom rather than the top, cleaning of the collection surfaces is not inhibited, and better access to the unit for maintenance is provided because there are minimal high voltage members above the array 30 of cells 30A. In addition, it allows for increasing the surface area of the collection surfaces if desired. The masts 50, when positioned within each cell 30A, maintain the array 30 of cells 30A at a desired voltage. In certain embodiments, the potential difference between the masts 50 and the collection surfaces is sufficient to cause current flow by corona discharge, which causes charging of the particulate entrained in the process stream.

In certain embodiments, washing liquid such as water can be periodically introduced into the unit and applied to the array 30 of cells 30A to dislodge particular matter that has collected on the collection surfaces. The washing liquid may or may not be the same as the sealing liquid provided that they are compatible because the washing and sealing liquid will mix with each other. For example, it may be desirable for the washing liquid to have additives that will dissolve the material to removed. These additives would not be required in the sealing liquid. In certain embodiments, a source of wash liquid (not shown), which may include a plurality of nozzles, may be positioned above (downstream of) the collecting tubes 15 and may be placed in fluid communication with a liquid source such as water.

In some embodiments, a gas distribution device, such as a perforated plate 70, may be provided downstream of the lower high voltage grid 41 and masts 50, to help distribute the process gas evenly through the cells 30A, with similar residence times in each.

In certain embodiments, the device is compartmentalized, or modularized, wherein there are two or more units 100 in a single particulate removal device such as a WESP. In some embodiments, there are three or more such modules.

One advantage of an up-flow device is that any water droplets present are carried upward by the airflow, and are eventually caused to collect on the collection plates. As a result, the up-flow device functions as a demister, preventing any droplets from becoming entrained in the gas flow that exits the device. Similarly, during a flush cycle of a particular compartment, which causes the gas flow to cease, water droplets cannot become entrained because no gas flow is leaving the compartment being flushed.

In certain embodiments, the internal volume of the bottom chamber region 10 below or upstream (in the direction of gas flow during normal operation) of the collection electrodes 30A can be reduced, such as by including a half-pipe or barrel member 76 or the like, which occupies volume that would otherwise be occupied by sealing liquid during a flushing cycle. In some embodiments, no liquid can occupy the region underneath the half-pipe or barrel member 76.

Figure 2:
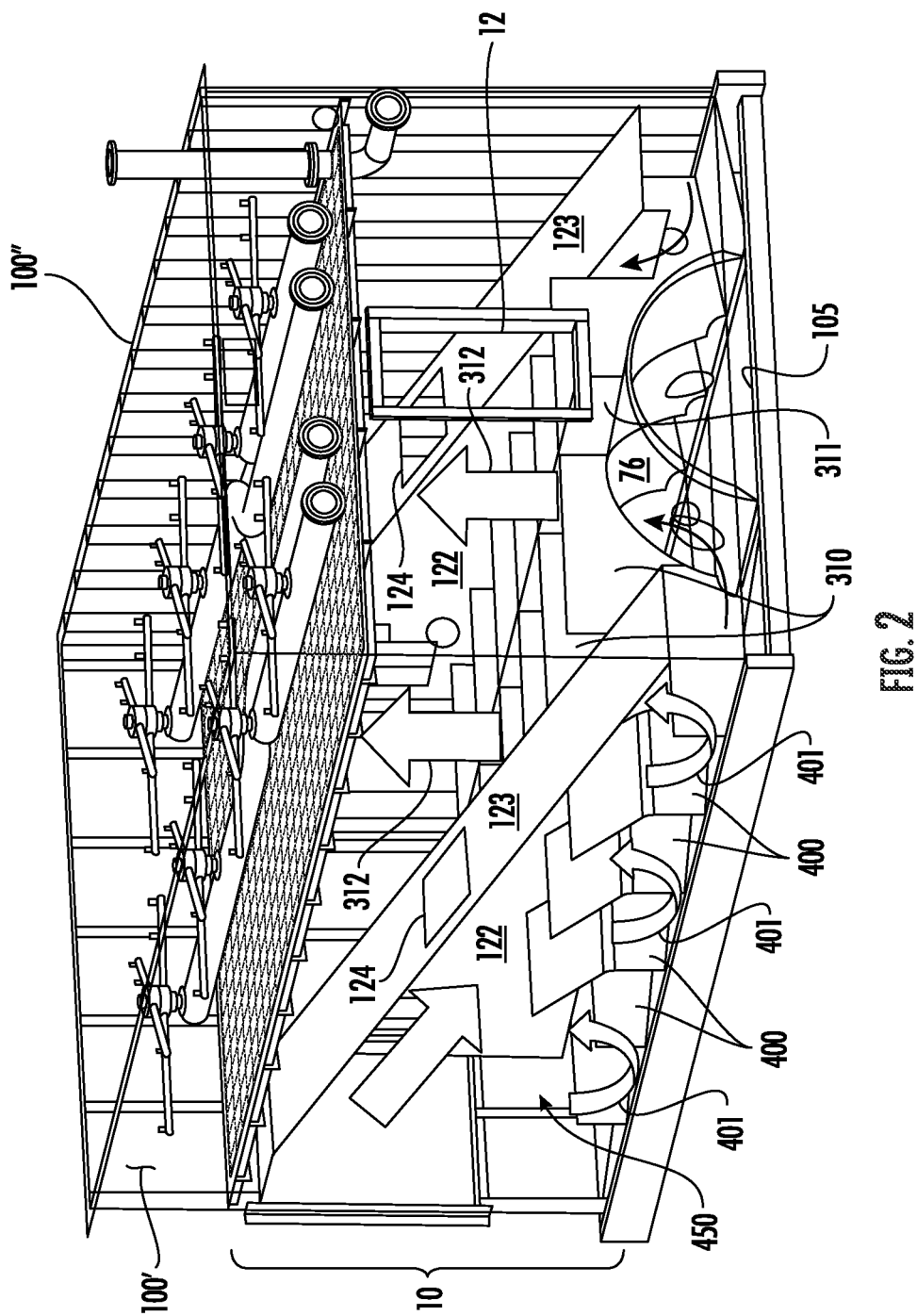
FIG. 2 is a perspective view of an exemplary WESP showing process gas flow in accordance with certain embodiments.
Figure 2A:
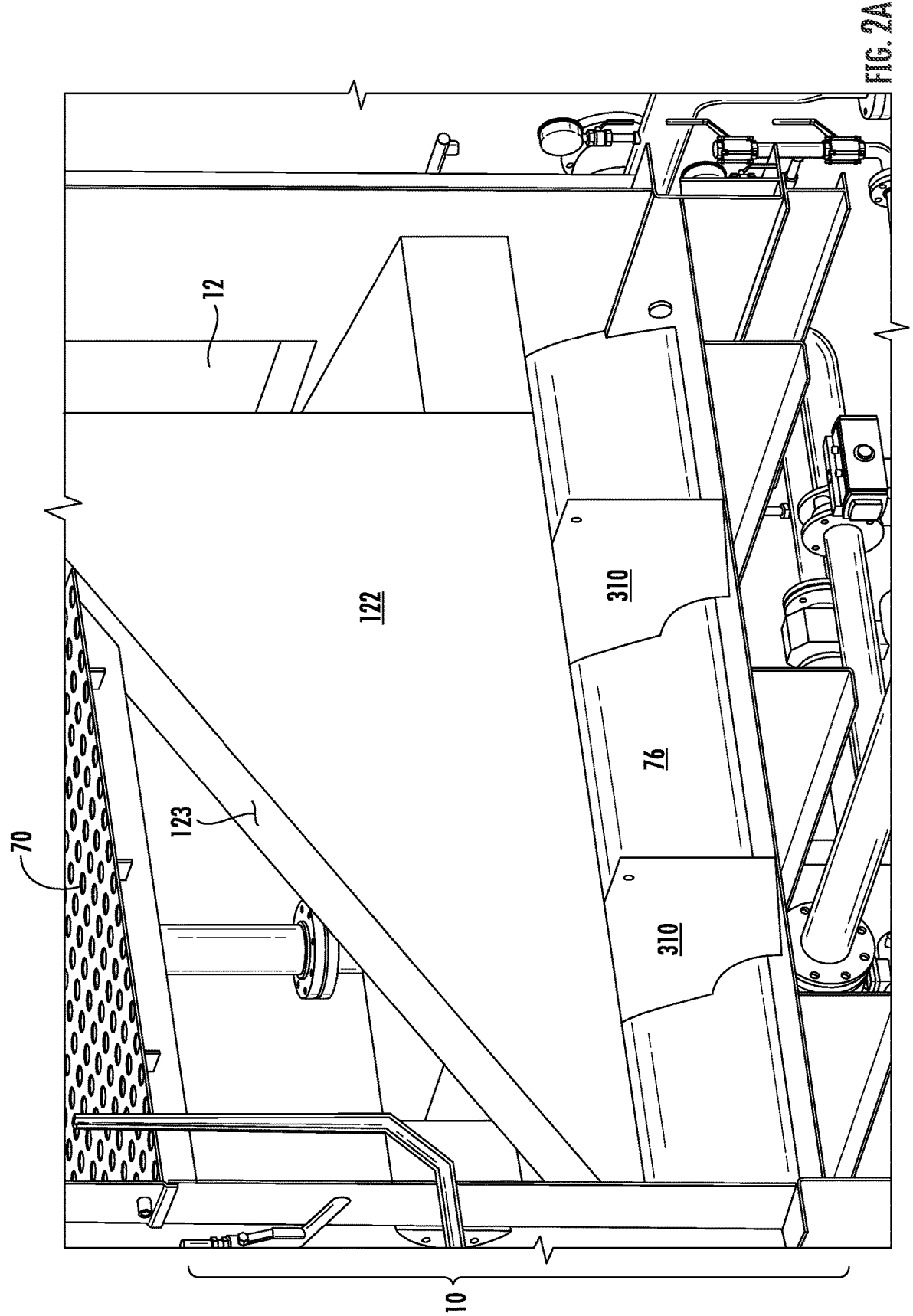
FIG. 2A is a perspective view of an exemplary WESP showing certain internal components in accordance with certain embodiments.

FIG. 2 illustrates the flow of process gas during operation of the WESP 100 in accordance with certain embodiments. In the embodiment shown, there are a plurality of wave-reducing baffles 310 that may be shaped to accommodate the half-pipe 76. In some embodiments, the baffles 310 are spaced from one another along the length of the half pipe 76, and are generally parallel with the front and rear walls of the unit 100 (see also FIG. 2A). Each of the baffles 310 may have a semi-circular cut-out that that allows it to accommodate the half=pipe 76 as shown. An additional baffle 311 may be positioned orthogonal to the baffles 310 and may bisect each baffle 310 as shown. The baffle arrangement helps reduce wave formation as the chamber region 10 of the module is flooded with liquid in an amount effective to stop gas flow into the module, and may also help direct flow of the process gas towards the collection electrodes as shown by the arrows 312 in FIG. 2. Waves can inhibit the speed at which the seal is achieved by allowing a gas flow path until the valley of the waves is of sufficient height to inhibit flow. Those skilled in the art will appreciate that other baffle arrangements may be used to achieve acceptable process gas flow distribution and/or wave formation inhibition.

FIG. 2 also illustrates a pair of spaced side chambers 450 (one shown) having a plurality of flow diverter baffles or vanes 400. In certain embodiments, the flow diverter baffles 400 include a plurality of spaced plates that extend vertically from the base or floor 105 of the WESP 100. A portion of one or more of the diverter baffles 400, such as the upper portion, may be angled or bent as shown, such at about a 45$^a$ angle, and terminates in a free end. Arrays of spaced diverter baffles 400 may be positioned in each of the side chambers 450 on opposite sides of the WESP 100, such as along the opposite side walls 100', 100'', with each array adjacent to a divider wall 122. Each divider wall 122 is spaced from a respective side wall 100', 100'', and delimits a side chamber 450. A generally horizontally extending top wall 123 extends from the top of each divider wall 122 towards a respective side wall 100', 100''. Each divider wall 122 extends downwardly from the top wall 123, and terminates above the base or floor 105 of the WESP 100. Accordingly, the diverter baffles 400 function by diverting process gas flow to the region between the bottom of each diverter wall 122 and the floor 105, out of the side chamber 105 and towards the baffles 310, as illustrated by arrows 401. The diverter baffles 400 create a gas flow direction change that encourages particulate drop out before the gas reaches the collection tubes. One or more of the top walls 123 may have an access opening 124 for maintenance purposes. If present, the access opening 124 should be closed and sealed during operation so that the water seal functions properly. In a preferred option said access opening 124 can be designed as openable and closable sealable door, hatch or cover or covered/closed by a removable sealing plate.

Figure 3A:
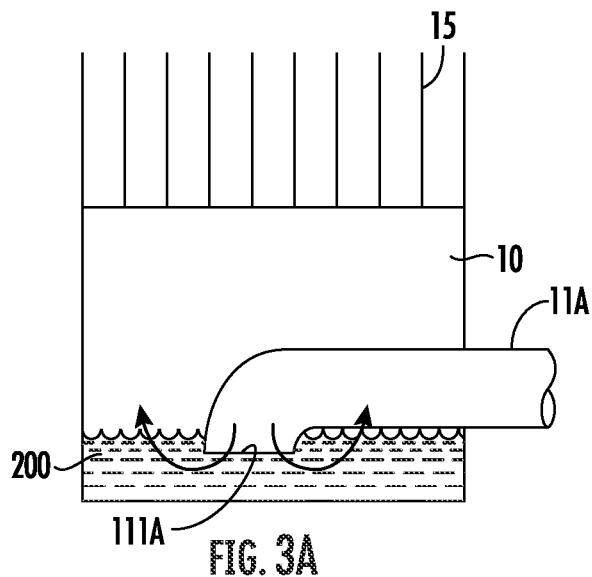
FIG. 3A is a side view of a gas inlet pipe in accordance with certain embodiments.
Figure 3B:
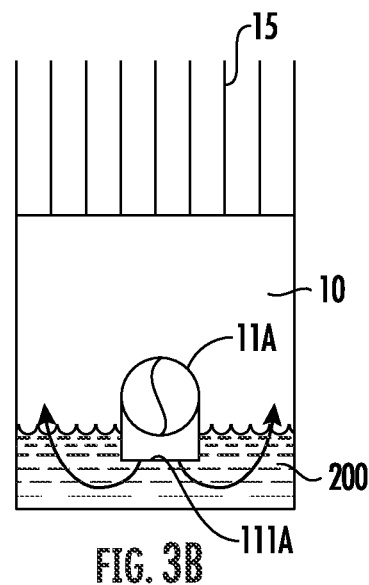
FIG. 3B is a front view of the gas inlet pipe of FIG. 3A.
Figure 4A:
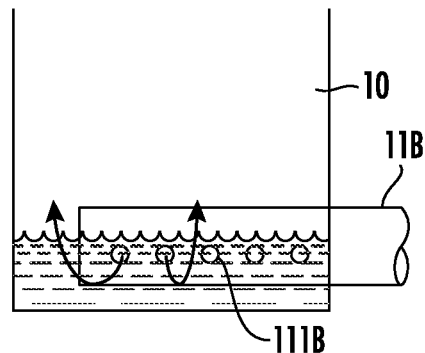
FIG. 4A is a side view of another gas inlet pipe in accordance with certain embodiments.
Figure 4B:
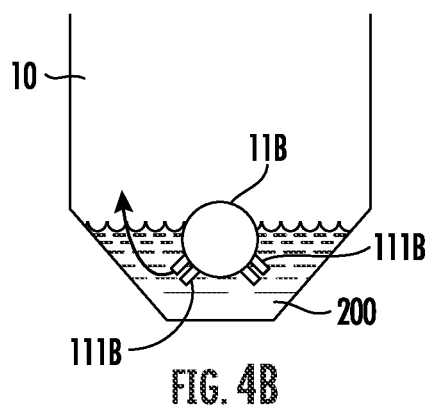
FIG. 4B is a front view of the gas inlet pipe of FIG. 4A.
Figure 5:
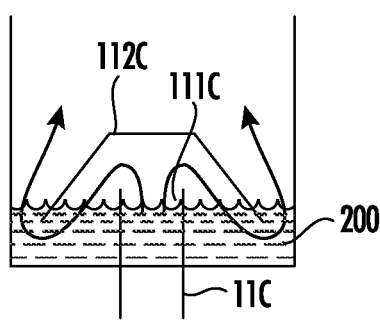
FIG. 5 is a front view of yet another gas inlet pipe in accordance with certain embodiments.

FIGS. 3-5 illustrate exemplary configurations of the gas inlet(s) 12. In certain embodiments, the gas inlet(s) 12 should be configured to allow flooding of the chamber with sealing liquid while gas is flowing, such that the sealing liquid ultimately overwhelms the gas flow and results in shutoff of that flow into the chamber. For example, in the embodiment shown in FIGS. 3A and 3B, gas inlet pipe 11A is elbow shaped, and has an outlet opening 111A facing towards the bottom of the WESP chamber 10, such that the gas flow through the gas inlet pipe 11A and out the outlet opening 111A is as depicted by the arrows. Once sufficient sealing liquid 200 submerges the outlet opening 111A to a sufficient extent, the gas flow out the outlet opening 111A ceases. The sealing liquid overwhelms the gas flow by increasing the resistance to this flow. Resistance to flow through a device is measured by pressure drop. The higher pressure drop, the greater the resistance. Pressure drop through a WESP is usually measured in units of inches (or millimeters) of water column (wc) with a typical range of 1 to 4 inches (25 to 101 millimeters). During normal operation with a multiple module system the gas flow and pressure drop through each module will be approximately equal. As sealing liquid is introduced to one module, the pressure drop in that module increases and more gas flow will go to other modules to balance the pressure drop. When the level of sealing liquid the gas would have to flow through exceeds the pressure drop of all the gas flowing through the other modules the gas flow through this module will cease.

For example, consider a three-module system in which the pressure drop through each module is typically 2 inches of water column. A first module begins filling with sealing liquid, forcing more gas flow through the second and third modules. Eventually all of the gas flow through needs to flow through the second and third modules, increasing the flow through each of these by 50%. Using the square law of flow vs. pressure in the turbulent flow regime, this will increase the pressure drop through the second and third modules by the square of the increase in flow. In this example, the pressure drop would increase to 4.5 inches of water column (2 inches×1.5$^2$). Once the sealing liquid level the gas would need to flow through exceeds 4.5 inches of water column, gas flow through the first module will cease.

In the embodiment shown in FIGS. 4A and 4B, gas inlet pipe 11B has a plurality of nozzles 111B that function as outlet openings facing downwardly towards the bottom of the chamber 10, such that the gas flow through the gas inlet pipe 11B and out the nozzles 111B is as depicted by the arrows. Once sealing liquid 200 submerges the nozzles 111$b$ to a sufficient extent, the gas flow out the nozzles 111$b$ ceases. In certain embodiments, there are two arrays of nozzles 111B, the nozzles in each array being linearly aligned.

In the embodiment shown in FIG. 5, gas inlet pipe 11C has an open end 111C, and a spaced hood 112C is positioned over the open end 111C as shown. The region between the hood 112C and the open end 111C allows for inlet gas to flow into the chamber, as depicted by the arrows. Once sealing liquid 200 submerges the region between the hood 112 and the open end 111C to a sufficient extent, the gas flow out ceases.

In certain embodiments, the process gas inlet pipe or pipes is positioned in the WESP in a region of the chamber where a sufficient level of liquid can be introduced so as to ultimately submerge the process gas inlet pipe opening(s) and cease gas flow emanating therefrom.

Figure 6A:
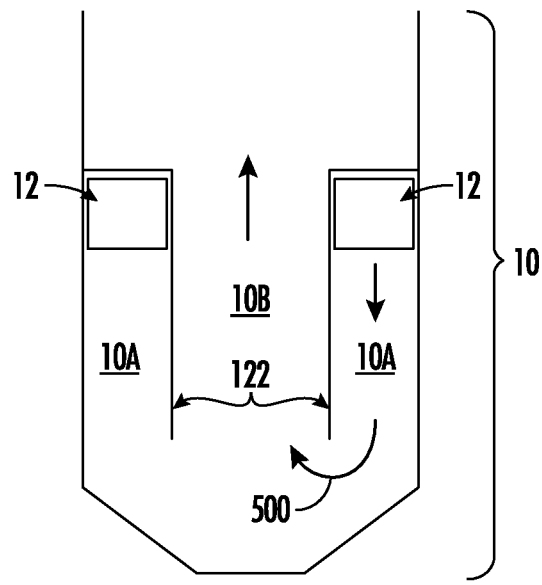
FIG. 6A is a schematic diagram of a chamber in a particulate removal device showing contaminated gas flow into the chamber, in accordance with certain embodiments.
Figure 6B:
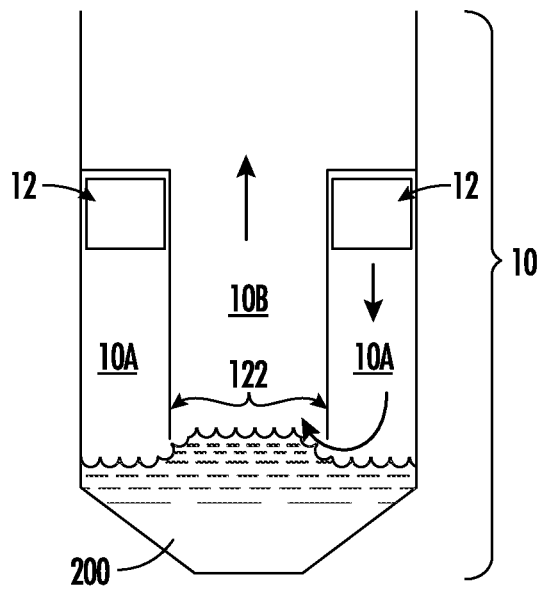
FIG. 6B is a schematic diagram of a chamber in a particulate removal device showing the partial reduction of contaminated gas flow into the chamber as a result of the introduction of sealing liquid, in accordance with certain embodiments.
Figure 6C:
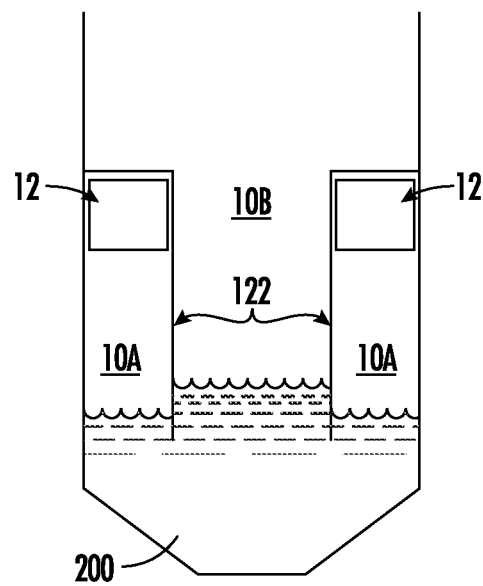
FIG. 6C is a schematic diagram of a chamber in a particulate removal device showing the full interruption of contaminated gas flow into the chamber as a result of the introduction of sealing liquid, in accordance with certain embodiments.

FIGS. 6A-6C show schematically the reduction and eventual complete cessation of gas flow as a result of a liquid flush in accordance with certain embodiments. As shown in FIG. 6A, chamber 10 has two spaced inlet openings 12 that allow for gas flow into the outer regions 10A of the chamber

10, as depicted by the arrows. Gas flows uninhibited from the outer regions 10A, under the dividing walls 122 and into the center 10B of the chamber 10, as shown by arrows 500. In FIG. 6B, the introduction of sealing liquid 200 has begun, and the sealing liquid 200 begins to accumulate at the base (in this embodiment shown as sloped) in the chamber 10 and begins to flood the chamber. Some gas is still able to flow from the outer regions 10A, percolate through the sealing liquid 200, flow under the dividing walls 122 and enter the center 10B of chamber 10, but there is a reduction in gas flow due to the presence of the sealing liquid 200. In FIG. 6C, the dividing walls 122 are now sufficiently submerged in the sealing liquid 200, preventing gas flow from the outer regions 10A to the center 10B of chamber 10. Due to the modular design of the apparatus, all gas flow is now directed into the one or more additional units that are not undergoing a flushing cycle. The module undergoing the flush may be isolated from the remaining module(s) for an extended period of time, without losing significant efficiency in the overall particulate matter removal process as compared to cleaning a module online, where the particulate removal efficiency of that module approaches 0% during the cleaning cycle.

In certain embodiments, sealing liquid may enter the chamber of the WESP such as by one or more wash liquid inlets 211 (FIG. 1, two shown) that are in fluid communication with a sealing liquid source.

Another significant advantage of cleaning a module offline is preventing mist carryover during the cleaning cycle. During online cleaning, some of the washing liquid is always carried out of the WESP as a mist by the gas flow through the system. Mist carryover can damage downstream equipment and/or be carried out an exhaust stack resulting in a "dirty rain". It is therefore desirable to minimize mist carryover to the greatest extent possible.

Once sufficient time has elapsed where the module undergoing the flush is clean, the sealing liquid may be removed from the chamber 10 through one or more suitable drains. As the level of sealing liquid in the chamber decreases, it no longer overwhelms the gas flow into the chamber 10, and the unit returns to its online status as gas flow resumes.

It will be appreciated by those skilled in the art, that isolation of the module for offline cleaning could also be accomplished by dampers to stop the gas flow. However, using sealing liquid to isolate a module has several advantages. The first is that in this dirty environment the dampers may get buildup on the sealing surfaces and may seal less effectively over time. The liquid seal will maintain a better seal over time. Another advantage is that buildup removed from the WESP during the cleaning cycle will fall into the seal liquid where it will be more readily removed from the module as the system is drained. A third advantage is eliminating the cost of a large moving component in the process gas stream.

Another preferred embodiment is that near the end of the flood cycle (the last 2 to 4 inches), the liquid level is raised quickly to achieve shut off of the process gas flow, on the order of 60 seconds or less. During this time, the final stage of the gas flow shutoff, there may be aggressive mixing between the process gas and sealing liquid. This can cause some of the sealing liquid to be entrained into the process gas and be carried into the electric field causing lower electric field strength and reduced cleaning performance during this time period. Therefore minimizing this time period is preferred.

Figure 7A:
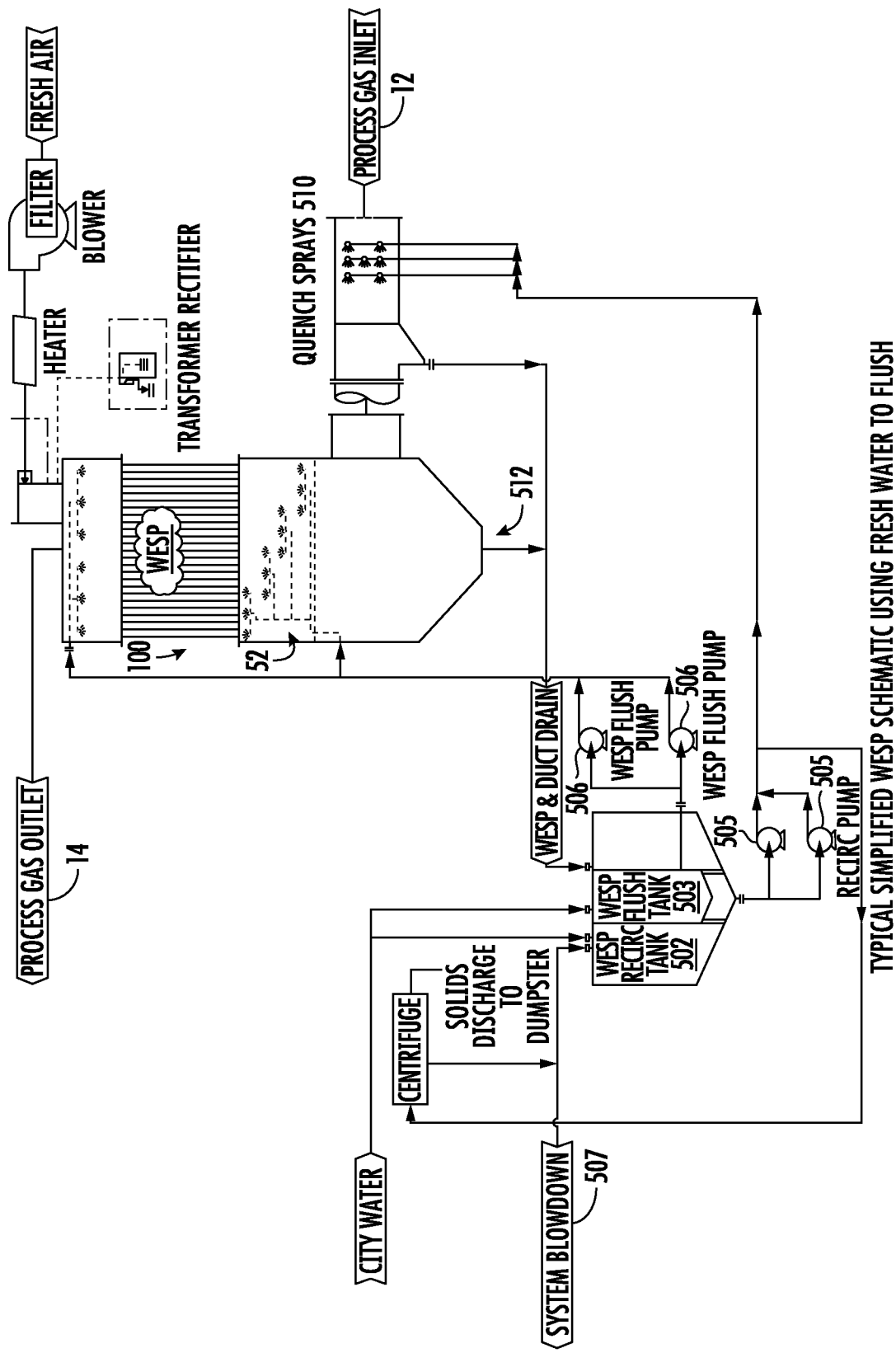
FIG. 7A is a schematic diagram of a particulate removal device showing the use of fresh water to flush in accordance with certain embodiments.

Another preferred embodiment is to use the recirculated water that is commonly used to saturate the process gas in these applications as the source of the liquid for the liquid seal of process gas flow in the system. The advantage of using this liquid is that it does not add any additional liquid to the process system that may be needed to be discharged from the system after completing the wash cycle. Thus, In certain embodiments, recirculating liquid may be used in place of fresh water or other clean liquid. As shown in FIG. 7A, recirculating liquid may be used continuously to quench the process gas to saturation temperature which is required for proper operation of the WESP. The embodiment of FIG. 7A uses fresh water from a suitable source (e.g., city water 500) to supply washing fluid to the upper and/or lower spray nozzles as shown. Thus, a WESP recirculation tank 502 and a suitable driving force such as one or more pumps 505 are provided to supply the quench sprays 510 for quenching the process gas as it is introduced into the WESP, and a flush tank 503 and a suitable driving force such as one or more pumps 506 are provided to supply fresh water to the upper and/or lower spray nozzles. The flush tank 503 can be located inside of the recirculation tank 502 as shown in FIG. 15A to heat the flush water using the heat from the recirculating water, which is typically 10 to 15 F less than the saturated air temperature. In practice this heats the flush water to approximately 40 to 60 F less than the recirculating water. In certain embodiments, the WESP has a fluid drain 512 in fluid communication with the recirculation tank 502 through suitable ductwork or the like. The use of fresh water limits the amount of water that can be used during the flush to less than or equal to the amount of water that is evaporated by saturating the gas and the amount of water that is removed through the system blowdown 507. Otherwise water will accumulate in the system.

Figure 7B:
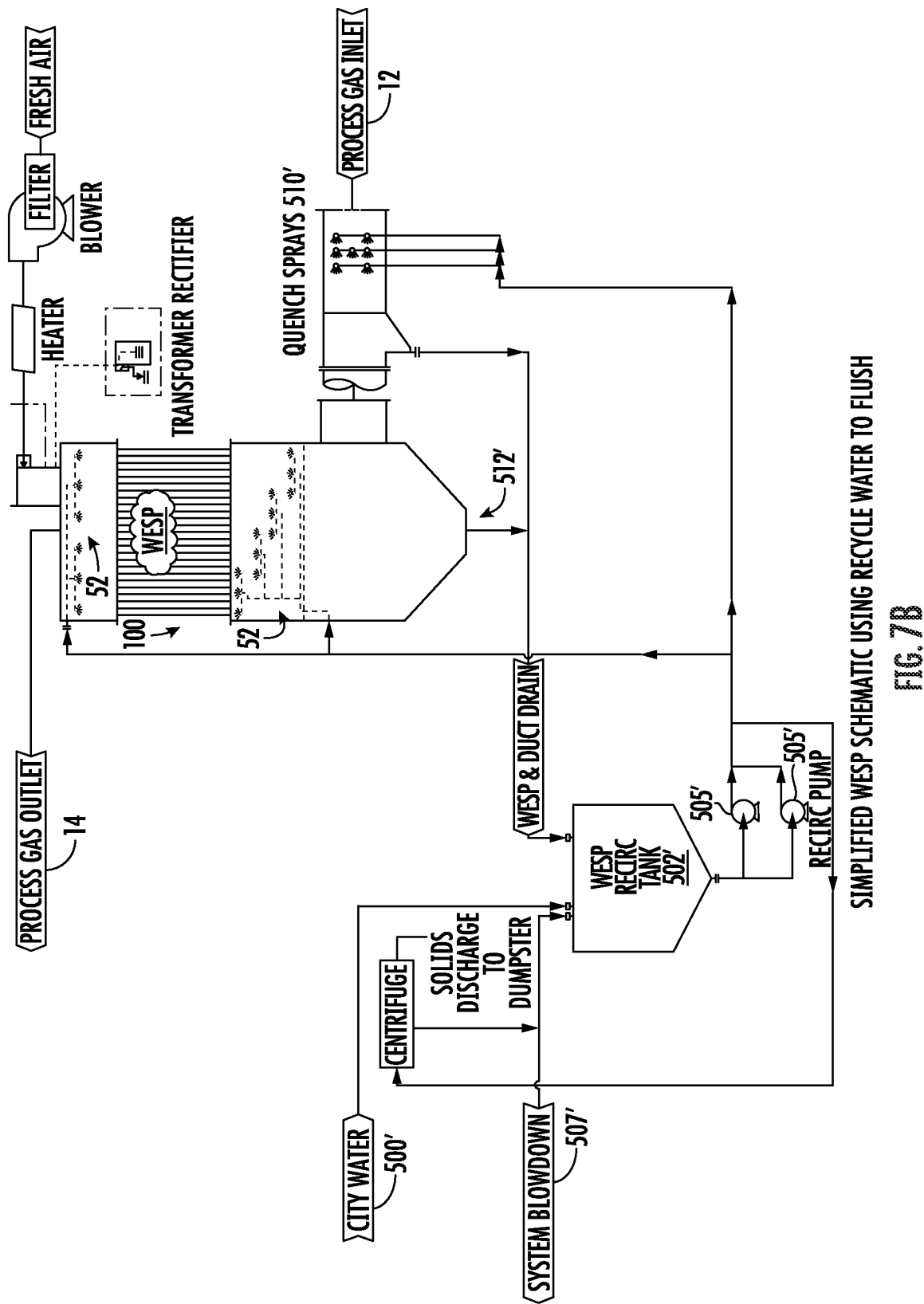
FIG. 7B is a schematic diagram of a particulate removal device showing the use of recirculating water to flush in accordance with certain embodiments.

In some embodiments such as that shown in FIG. 7B, recirculating liquid also may be used as a source of washing fluid supply. Using this liquid for cleaning collection surfaces allows a much larger volume of liquid to be used for cleaning without impacting the accumulation of water in the system. The recirculating water typically has a substantial amount of solids in it (between 2-4% by weight). Accordingly, the liquid may be filtered or screened to remove larger solids (typically greater than ⅛"). Therefore, as discussed above the spraying components may be designed to function while flowing the particulate laden water. As shown in FIG. 7B, Water from the recirculation tank 502' is used as the source of washing fluid to the upper and/or lower spray nozzles and to the quench sprays 510' as shown. A suitable driving force such as one or more pumps 505' are provided to supply the quench sprays 510' for quenching the process gas as it is introduced into the WESP, and to supply recirculating water to the upper and/or lower spray nozzles. In certain embodiments, the WESP has a fluid drain 512' in fluid communication with the recirculation tank 502' through suitable ductwork or the like. In this case, fresh water from a suitable source (e.g. city water 500') is only used as make-up water as needed to balance the system from evaporation losses and system blowdown 507'.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A method of ceasing gas flow into a particulate removal device, comprising:
    providing the particulate removal device comprising at least one ionizing electrode, at least one particulate collection electrode, a source of high voltage for charging said at least one ionizing electrode, a source of sealing liquid, and a first chamber having at least one inlet for introducing a process gas into said particulate removal device, said first chamber being in fluid communication with said at least one ionizing electrode and said at least one particulate collection electrode;
    introducing said process gas into said first chamber via said at least one inlet;
    introducing said sealing liquid into said first chamber in an amount sufficient to submerge said at least one inlet and stopping said flow of said process gas into said first chamber; and
    flushing said first chamber while said sealing liquid is preventing said process gas flow through said first chamber.

2. The method of claim 1, wherein said sealing liquid is water.

3. The method of claim 1, wherein said particulate removal device comprises a second chamber in fluid communication with a second ionizing electrode and a second collecting electrode, and wherein as said flow of said process gas in said first chamber is ceased, said flow of said process gas diverts to said second chamber.

4. The method of claim 1, wherein said first chamber comprises a volume reducer.

5. The method of claim 1, wherein said volume reducer comprises a half pipe.

6. The method of claim 1, wherein said first chamber includes one or more wave reducing baffles.

7. The method of claim 6, wherein there are a plurality of spaced wave reducing baffles.

8. The method of claim 1, further comprising draining said sealing liquid from said first chamber.

9. The method of claim 1, wherein the last 2 to 4 inches of said sealing liquid is added in 60 seconds or less.

* * * * *